US010380612B1

(12) United States Patent
Sinnott

(10) Patent No.: US 10,380,612 B1
(45) Date of Patent: Aug. 13, 2019

(54) SYSTEM AND METHOD FOR DETERMINING THE VALUE OF CHANNELS

(71) Applicant: KABAM, INC., San Francisco, CA (US)

(72) Inventor: Brendan Sinnott, Bend, OR (US)

(73) Assignee: Kabam, Inc., San Francisco, CA (US)

(*) Notice: Subject to any disclaimer, the term of this patent is extended or adjusted under 35 U.S.C. 154(b) by 209 days.

(21) Appl. No.: 15/385,844

(22) Filed: Dec. 20, 2016

(51) Int. Cl.
G06Q 30/02 (2012.01)
G06F 8/61 (2018.01)

(52) U.S. Cl.
CPC ........... *G06Q 30/0202* (2013.01); *G06F 8/61* (2013.01); *G06Q 30/0255* (2013.01)

(58) Field of Classification Search
CPC ............ G06Q 10/00–50/00; G06F 1/00–21/00
USPC ................................. 705/7.11–7.42
See application file for complete search history.

(56) References Cited

U.S. PATENT DOCUMENTS

| 6,036,601 | A  | * | 3/2000 | Heckel .................. G06Q 30/02 273/461 |
| 8,010,404 | B1 | * | 8/2011 | Wu ....................... G06Q 30/02 705/1.1 |
| 8,182,346 | B2 | * | 5/2012 | Herrmann ............. G06Q 30/02 463/42 |
| 8,260,657 | B1 | * | 9/2012 | Conway ................ G06Q 30/02 380/231 |
| 8,463,869 | B2 |   | 6/2013 | Morse |
| 9,144,742 | B1 | * | 9/2015 | Curtis .................... A63F 13/12 |
| 9,381,425 | B1 | * | 7/2016 | Curtis .................... A63F 13/822 |
| 9,908,039 | B1 | * | 3/2018 | Rull ....................... A63F 13/10 |
| 2003/0154282 | A1 |   | 8/2003 | Horvitz |
| 2003/0177055 | A1 | * | 9/2003 | Zimmerman, Jr. ........ G06Q 10/06375 705/7.37 |
| 2005/0028188 | A1 | * | 2/2005 | Latona .................. G06Q 30/02 725/13 |
| 2006/0111175 | A1 | * | 5/2006 | Walker .................. G07F 17/32 463/21 |

(Continued)

FOREIGN PATENT DOCUMENTS

KR 20130119748 11/2013

OTHER PUBLICATIONS

Berman, Saul J., et al. "New business models for the new media world." Strategy & Leadership 35.4 (2007): 23-30. (Year: 2007).*

(Continued)

*Primary Examiner* — Alan S Miller
(74) *Attorney, Agent, or Firm* — Esplin & Associates, PC

(57) ABSTRACT

A system configured to determine the value of channels responsive to users requesting installation of a client application through the channels. The client application may provide access to an online game. A given channel may be characterized by a promotional information item, a platform through which the promotional information item is presented to potential users, and/or other information. Predicted economic values for the users that requested installation of the client application through one or more channels may be determined based parameter values for the users. Effectiveness metrics for the channels may be determined based on the predicted economic values of the users. Subsequent consideration expenditures for one or more of the channels may be recommended and/or executed based on a comparison effectiveness metrics determined.

21 Claims, 4 Drawing Sheets

(56) References Cited

U.S. PATENT DOCUMENTS

| | | | |
|---|---|---|---|
| 2006/0135232 A1* | 6/2006 | Willis | A63F 13/12 463/1 |
| 2008/0091517 A1 | 4/2008 | Koonce | |
| 2008/0097827 A1* | 4/2008 | Leach | G06Q 10/06315 705/7.25 |
| 2009/0070081 A1* | 3/2009 | Saenz | G07F 17/32 703/2 |
| 2009/0197582 A1* | 8/2009 | Lewis | H04W 4/02 455/414.2 |
| 2011/0055008 A1* | 3/2011 | Feuerstein | G06Q 30/02 705/14.51 |
| 2011/0173071 A1* | 7/2011 | Meyer | G06Q 30/02 705/14.54 |
| 2011/0313845 A1* | 12/2011 | Richardson | G06Q 30/0243 705/14.42 |
| 2012/0059713 A1* | 3/2012 | Galas | G06Q 30/0244 705/14.49 |
| 2012/0221430 A1* | 8/2012 | Naghmouchi | G06Q 30/0283 705/26.7 |
| 2012/0245988 A1* | 9/2012 | Pace | G06Q 30/0283 705/14.25 |
| 2013/0073366 A1* | 3/2013 | Heath | G06Q 30/0259 705/14.25 |
| 2013/0103521 A1* | 4/2013 | Liu | G06Q 30/06 705/26.1 |
| 2013/0238777 A1 | 9/2013 | Raleigh | |
| 2014/0108129 A1* | 4/2014 | Klein | G06Q 30/02 705/14.45 |
| 2015/0363817 A1* | 12/2015 | Viharo | G06Q 30/0239 725/14 |
| 2016/0275547 A1* | 9/2016 | Jawde | G06Q 30/02 |
| 2017/0147318 A1* | 5/2017 | Bourke | G06F 8/61 |
| 2018/0225027 A1* | 8/2018 | Cooke | G06F 3/04842 |

OTHER PUBLICATIONS

Lescop, Denis, and Elena Lescop. "Exploring mobile gaming revenues: The price tag of impatience, stress and release." Digiworld Economic Journal 94 (2014): 103. (Year: 2014).*

Tene, Omer, and Jules Polenetsky. "To track or do not track: advancing transparency and individual control in online behavioral advertising." Minn. JL Sci. & Tech. 13 (2012): 281. (Year: 2012).*

* cited by examiner

SYSTEM AND METHOD FOR DETERMINING THE VALUE OF CHANNELS

FIELD OF THE DISCLOSURE

This disclosure relates to determining the value of channels through which users may request installation of a client application.

BACKGROUND

Online games and/or services may be accessed by users through client applications installed on one or more user devices that provide access to the online game and/or service. Some providers may generate revenue via individual installations by requiring users to pay for the client application. Other providers (e.g., providing free to play online games and/or free service applications) may generate revenue through micro-transactions within the game or application made by the users. Some users may be more valuable to providers over the life of the game and/or application than others. Existing technologies may use user purchase information to identify which users are more valuable.

Various types of advertisements for online games and/or services may be provided to users via various platforms. Determining the effectiveness of advertisements generally looks at the revenue generated by the advertisement.

SUMMARY

One aspect of the disclosure relates to a system for determining the value of channels through which users may request installation of a client application. The system may determine the value channels based on the predicted economic value of the users that request installation of a client application through the channels. The predicted economic value of the users may be determined based on parameter values for user parameters associated with the users. The predicted economic values for the users may be determined at and/or near installation of the client application through which an online game is accessed, without having to wait until the user makes purchases within the online game. In fact, the user parameters of the present application may not include purchase information describing user purchases within the online game accessible through the client computing platform because using such information as a prediction of user value for new users is often infeasible and unreliable. As provided herein, effectiveness metrics for a given channel may be determined based on the predicted economic values of the users that requested installation of the client application through that channel. The system may recommend and/or execute subsequent consideration expenditures for one or more of the channels based on the effectiveness metrics determined.

In some implementations, the system may comprise one or more physical processors configured to execute machine-readable instructions to implement system components. The system components may include one or more of an installation information component, user parameter component, economic value component, effectiveness component, recommendation component, and/or other components.

The installation information component may be configured to obtain installation information for individual installations of the client application requested through individual ones of the channels. The installation information may identify the specific channels through which individual ones of the users requested installation of the client application. A given channel may be characterized by a promotional information item, a platform through which the promotional information item is presented to potential users, and/or other information.

In some implementations, individual ones of the channels may include a promotional information item, the platform through which the promotional information item is presented to potential users, and/or other information. The promotional information item may include one or more of an advertisement, an offer, and/or an endorsement related to the online game and/or an online service accessible via the client application. The platform may include a social media platform, a game distribution platform, an email platform, a web search platform, a website platform, an application platform, and/or other platforms. Users may request installation of the client application through individual channels directly, and/or indirectly. By way of non-limiting example, a user may request installation of the client application via an individual channel.

The installation information component may be configured to obtain installation information for individual installations of the client application requested through individual ones of the channels by the one or more users. The installation information may identify a specific channels through which individual ones of the users requested installation of the client application. A given channel may be characterized by a promotional information item, platform through which the promotional information item is presented to potential users, and/or other information.

Installation information component 106 may obtain first installation information, second installation information, and/or other installation information. The first installation information may identify the first channel through which a first set of users requested installation of the client application. The second installation information may identify the second channel through which a second set of users requested installation of the client application. The first channel may be characterized by a first promotional information item, a first platform through which the first promotional information item was presented to the first set of users, and/or other information. The second channel may be characterized by a second promotional information item, a second platform through which the second promotion information item was presented to the second set of users, and/or other information.

The user parameter component may be configured to obtain parameter values for user parameters associated with the users that requested installation of the client application. The user parameters may include one or more of demographic parameters, device parameters, location parameters, gameplay parameters, time parameters, and/or other parameters. The parameter values may quantify and/or characterize the user parameters associated with individual ones of the users. Demographic parameters may include characteristics (e.g., socioeconomic characteristics) describing the users that requested installation of the client application. The device parameters may characterize client computing platforms on which the users install the client application and/or access the online game. Location parameters may characterize real-world location information associated with one or more of the users and/or the devices on which the client application is installed. Gameplay parameters may describe one or more aspects of the users' gameplay in the online game accessible via the client application, and/or in other online games. Time parameters may indicate times associated with the user's installation and/or set up of the online game.

The economic value component may be configured to determine predicted economic values of the users. The predicted economic values of the users may be determined based on the parameter values associated with the users. The economic values for the first set of users may be determined based on the parameter values associated with the first set of users. The predicted economic values for the second set of users may be determined based on the parameter values associated with the second set of users.

The effectiveness component may be configured to determine effectiveness metrics for the channels through which the users requested installation of the client application. The effectiveness metrics for the channels may be determined based on the predicted economic values of the users that requested installation of the client application through the channels. The effectiveness metrics may indicate how effective individual channels are in causing potential users to request installation of the client application and/or access the online game. The effectiveness metrics may indicate economic values for the individual channels. A first effectiveness metric for the first channel may be determined based on the predicted economic values for the first set of users that requested installation of client application through the first channel. A second effectiveness metric for the second channel may be determined based on the predicted economic values for the second set of users that requested installation of client application through the second channel.

The recommendation component may be configured to recommend subsequent consideration expenditures for one or more of the first channel and/or the second channel. A subsequent consideration expenditure may be recommended for the first channel and/or the second channel based on a comparison of the first effectiveness metric for the first channel relative to the second effectiveness metric for the second channel.

In some implementations, the recommendation component may be configured to execute one or more subsequent consideration expenditures for the first channel and/or the second channel. The one or more subsequent consideration expenditures for the first channel and/or the second channel may be executed based on a comparison of the first effectiveness metric for the first channel relative to the second effectiveness metric for the second channel.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
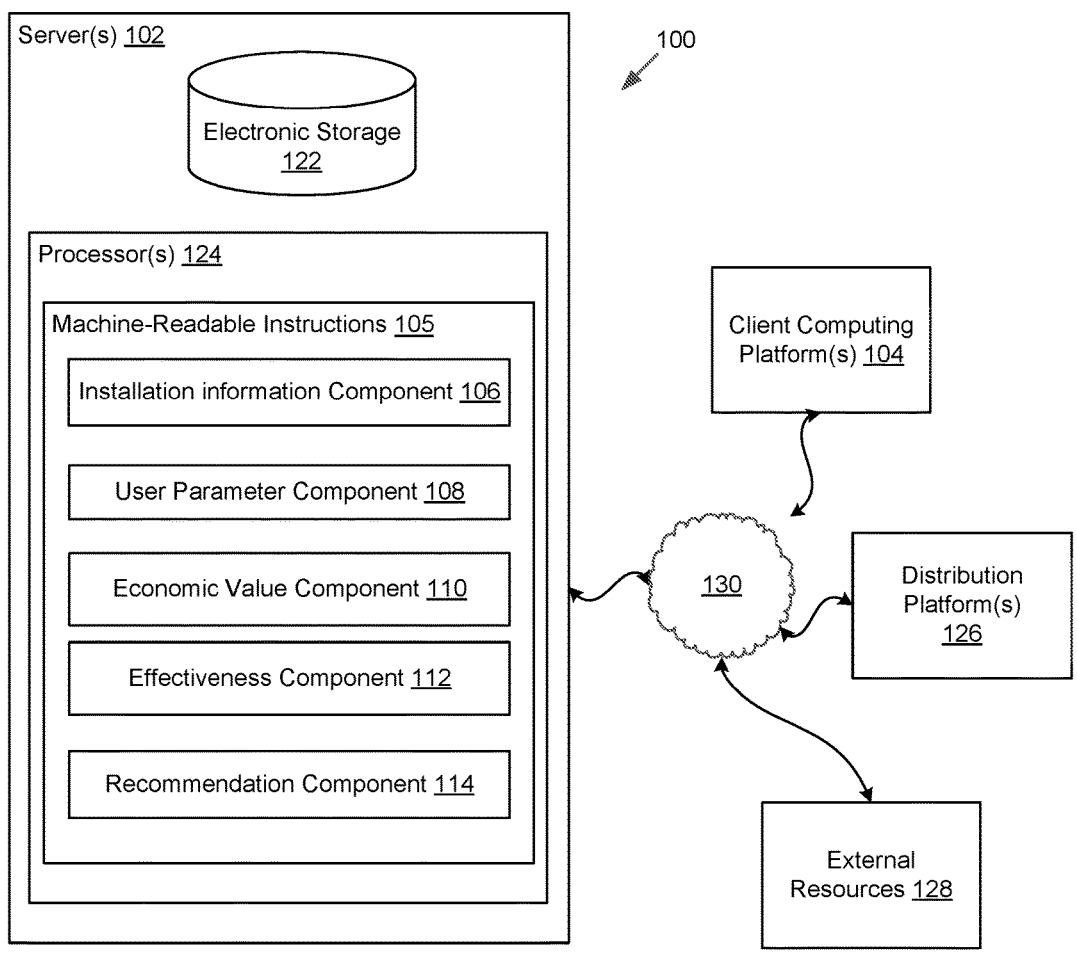
FIG. 1 illustrates a system configured to determine the value of channels through which users may request installation of a client application, in accordance with one or more implementations.

FIG. 1 illustrates a system 100 configured to determine the value of channels through which users may request installation of a client application, in accordance with one or more implementations. The system may determine the value of channels responsive to the users requesting installation of the client application through the channels. In some implementations, the client application may provide access to an online game, virtual space, and/or other online service. A given channel may be characterized by a promotional information item, a platform through which the promotional information item is presented to potential users, and/or other information.

System 100 may be configured to determine the value of channels responsive to users requesting installation of the client application through the channels. In some implementations system 100 may include one or more server(s) 102. The servers 102 may be configured to communicate with one or more client computing platforms 104, and/or one or more distribution platforms 126, according to a server/server architecture, a client/server architecture, and/or other architecture. As shown, a given server 102, such as the server 102 shown, may comprise a processor 124 configured to execute machine-readable instructions 105 to implement system components. The computer program components may include one or more of an installation information component 106, user parameter component 108, economic value component 110, effectiveness component 112, recommendation component 114, and/or other components.

Installation information component 106 may be configured to obtain installation information for individual installations of the client application requested through individual ones of the channels. The installation information may identify the specific channels through which individual ones of the users requested installation of the client application. The installation information may be obtained by installation information component 106 from one or more of distribution platforms 126, and/or other sources.

A given channel may be characterized by a promotional information item, a platform through which the promotional information item is presented to potential users, and/or other information. In some implementations, a promotional information item may include one or more of an advertisement, an offer, and/or an endorsement related to the online game and/or an online service accessible via the client application. Users may request installation of the client application through individual channels directly, and/or indirectly. By way of non-limiting example, a user may request installation of the client application via an individual channel directly by interacting with the individual channel to initiate installation of the client application. The user may request installation of the client application via individual channel indirectly, for example, by interacting with the individual channel which may direct the user to a distribution platform (e.g., App Store, Play Store, Kabam Games, Steam, and/or other distribution platforms)

Distribution platform(s) 126 may include one or more platforms through which the client application is distributed to one or more client computing platform(s) 104, and/or the online game is accessed by one or more users. Distribution platform(s) 126 may include one or more third-party platforms. In some implementations, the client application providers (e.g., a game provider, and/or other service provider) may partner with one or more third-party platform(s) 126 to distribute the client application.

Distribution platform(s) may, by way of non-limiting example, include one or more of an application store/marketplace, an online marketplace, an application platform, and/or other distribution platforms. An application platform may include, for example, a gaming platform that facilitates access to multiple online games. The multiple online games may be provided by one or more game providers and/or hosted by one or more gaming servers. The client computing platforms 104 may include, for example, a cellular telephone, a smartphone, a laptop, a tablet computer, a desktop computer, a television set-top box, smart TV, a gaming console, and/or other platform. The users may access the client application and/or the online game via the client computing platforms 104.

In some implementations, one or more features and functions of server 102 may be attributed to one or more client computing platforms 104. By way of non-limiting example, individual ones of the client computing platforms 104 may include machine-readable instructions comprising the same or similar components as machine-readable instructions 105 of server 102. The client computing platforms 104, server 102, and/or distribution platform(s) 126 may be configured to locally implement a game instance of the online game and/or facilitate participation of one or more users in the online game.

Installation information component 106 may be configured to obtain installation information for individual installations of the client application. The individual installations may be requested through individual ones of the channels. The individual installations may be requested by the one or more users. In some implementations, installation information component 106 may be configured to receive and/or obtain installation information from one or more client computing platforms 104, one or more distribution platform(s) 126, and/or other sources. Installation information component 106 may receive and/or obtain installation information over a network.

The installation information may identify a specific channels through which individual ones of the users requested installation of the client application. In some implementations multiple users may request installation of a client application through the same specific platform. The multiple users that requested installation of the client application through the same specific platform may make up a set of users. The installation information identifying the specific channels may indicate a set of multiple users that requested installation of the client application. As such, the installation information may identify specific channels, indicate one or more sets of users that requested installation of the client application through the specific channels, include user information for individual users in the one or more sets of users, and/or include other information.

A given channel may be characterized by a promotional information item, a platform through which the promotional information item is presented to potential users, and/or other information. The installation information may include information identifying the promotional information item, the platform through which of virtual information item is presented to potential users, and/or other information characterizing a given channel. Requesting installation of the client application through an individual channel may, for example, include requesting installation of the client application responsive to and/or within a time period of interacting (e.g., clicking, viewing, accepting access, proving user input, and/or other interactions) with the individual channel, directly and/or indirectly requesting installation of the client application via the individual channel, and/or otherwise requesting installation of the client application through an individual channel.

The promotional information item may include one or more of an advertisement, a promotion, an offer, an endorsement, and/or other promotional information items. The promotional information item may be related to the online game and/or the client application. The promotional information item may be provided by the online game provider, and/or client application provider to promote and/or incentivize potential users to play the online game and/or install the client application.

The platform through which the promotional information item is presented to the potential users may include one or more of a social media platform, a game distribution platform, an email platform, a web search platform, a website platform, an application platform, and/or other platforms through which the promotional information item is presented to the potential users. By way of non-limiting example, the social media platform may include one or more of YouTube, Facebook, Raptr, Gamurs, WeGame, Tumblr, Instagram, Twitter, Google+, Cellufun, and/or other social media platforms. A game distribution platform may include a platform that facilitates the sale and/or digital distribution of games via the Internet. The game distribution platform(s) may include one or more of Steam, Origin, Xbox Live Marketplace, PlayStation Store, Amazon.com, GAME, GameStop, G2A, and/or other game distribution platforms.

An email platform may include one or more of Gmail, Yahoo, AOL, and/or other email platforms through which a promotional information item may be presented. By way of non-limiting example, a promotional information item may be presented within an email platform as an email, an inline advertisement (i.e., banner), and/or another manner. A web search platform may include one or more search engines such as, for example Google, Yahoo, Bing, and/or other search engines. The promotional information item may be presented via a web search platform as sponsored links, inline advertisements, and/or via other presentation methods.

A website platform may include one or more websites accessible by the potential users. By way of non-limiting example a website platform may include one or more of an informational website, a blog, an online store and/or marketplace, and/or other website. An application platform may include an application distribution platform through which users may purchase, install, and/or download one or more client applications. By way of non-limiting example, the application platform may include an app store or marketplace (e.g., iTunes, Google Play, Amazon app store, and/or other app stores or marketplaces), a game platform (e.g., an online game, a web in a gaming application, and/or other game platforms), and/or other application platform. The application platform may display one or more advertisements, offer one or more promotions, and/or otherwise display a promotional information item. In some implementations, the platform through which the promotional information item is presented to the potential users may include one or more distribution platform(s) 126.

In some implementations, multiple promotional information items may be presented to the potential users via a single platform. By way of non-limiting example, individual ones of the multiple promotional information items together with the single platform may characterize a single channel. In some implementations, a potential user may view and/or interact with multiple channel. Individual channels may be different from other channels. In some implementations, different individual channels may include one or more portions that are the same. By way of non-limiting example, a first channel may be characterized by an advertisement presented through a social media platform, and/or a second channel may be characterized by a different advertisement presented through the same social media platform and/or the same advertisement presented through a different platform. Various combinations of one or more promotional information items and/or one or more platforms through which the promotional information items are presented to potential users that characterize one or more channels are considered.

Figure 2A:
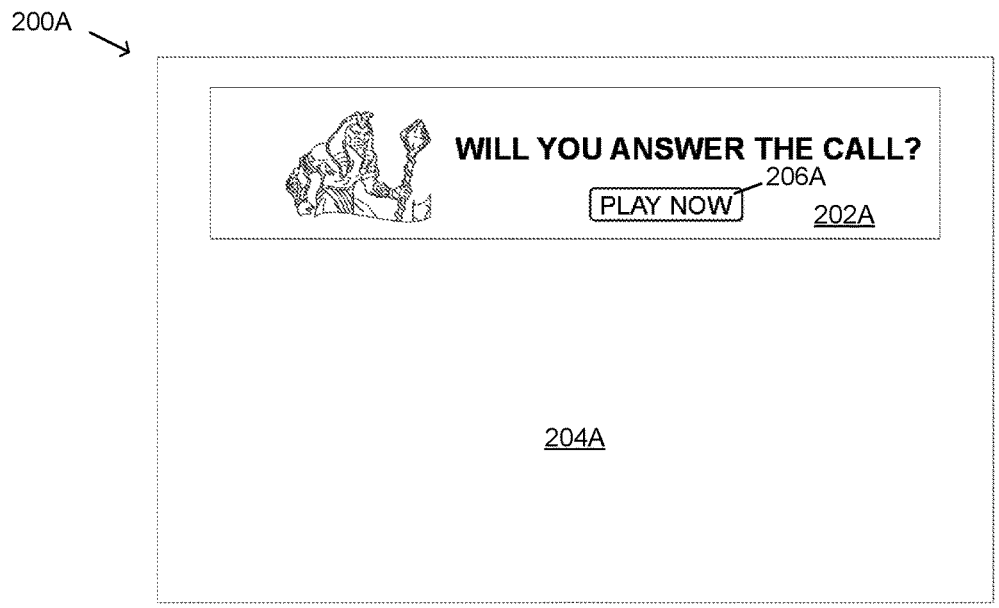
FIG. 2A illustrates a first channel, in accordance with one or more implementations.

FIG. 2A illustrates a first channel 200A, in accordance with one or more implementations. First channel 200A may be characterized by first promotional information item 202A, first platform 204A through which first promotional information item 202A is presented to potential users, and/or other information. First promotional information item 202A may include an advertisement for the online game. First platform 204A may include a social media platform, a game distribution platform, an email platform, a web search platform, a website platform, an application platform, and/or other platforms through which the promotional information item is presented to the potential users. By way of non-limiting example, first platform 204A may include a game distribution platform comprising a website. First promotional information item 202A may be presented in the form of a leaderboard, pop-under, banner, and/or in any other format, on first platform 204A. By way of non-liming example, one or more users and/or set of users may request installation of the client application through channel 200A by clicking "play now" button 206A.

Figure 2B:
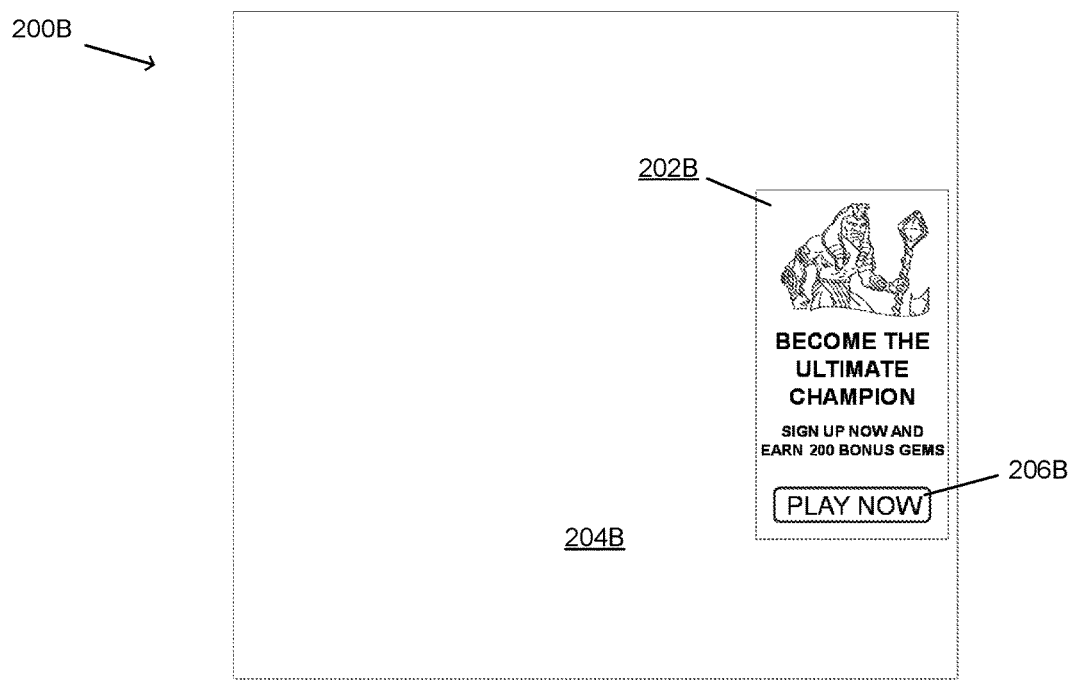
FIG. 2B illustrates a second channel, in accordance with one or more implementations.

FIG. 2B illustrates a second channel 200B, in accordance with one or more implementations. Second channel 200B may be characterized by second promotional information item 202B, second platform 204B through which second promotional information item 202B is presented to potential users, and/or other information. Second promotional information item 202B may include an offer and/or promotion for the online game. Second platform 204B may include a social media platform, a game distribution platform, an email platform, a web search platform, a website platform, an application platform, and/or other platforms through which the promotional information item is presented to the potential users. By way of non-limiting example, second platform 204B may include a web search platform and/or a social media platform. Second promotional information item 202B may be presented in the form of a side-banner, and/or in any other format, on second platform 204B. By way of non-liming example, one or more users and/or set of users may request installation of the client application through channel 200B by clicking "play now" button 206B.

Returning to FIG. 1, in some implementations, installation information component 106 may obtain first installation information. The first installation information may identify the first channel through which a first set of users requested installation of the client application. The first set of users may include multiple users that requested installation of the client application through the first channel. The first channel may be characterized by a first promotional information item, a first platform through which the first promotional information item was presented to the first set of users, and/or other information.

In some implementations, installation information component 106 may obtain second installation information. The second installation information may identify the second channel through which a second set of users requested installation of the client application. The second channel may be characterized by a second promotional information item, a second platform through which the second promotion information item was presented to the second set of users, and/or other information.

User parameter component 108 may be configured to obtain parameter values for user parameters associated with the users. User parameter component 108 may be configured to obtain parameter values associated with the users that requested installation of the client application. As such, in some implementations, parameter values associated with the users within the set of users that requested installation of the client application through the specific channels may be obtained. The user parameters may include one or more of demographic parameters, device parameters, location parameters, gameplay parameters, time parameters, and/or other parameters. The parameter values may quantify and/or characterize the user parameters associated with individual ones of the users.

Demographic parameters may include characteristics (e.g., socioeconomic characteristics) describing the users that requested installation of the client application. By way of non-limiting example, the demographic parameters may include one or more of age, sex, education level, income level, marital status, occupation, religion, and/or other demographic parameters. The device parameters may characterize client computing platforms on which the users install the client application and/or access the online game. Device parameters may include, for example, one or more of the device model, capabilities of the device, features of the device, resolution supported by the device, network connection information (e.g., whether or not the device has an Internet connection, how strong the Internet connection is, and/or other network connection information), whether or not the device is the latest model available, and/or other device parameters.

Location parameters may characterize real-world location information associated with one or more of the users and/or the devices on which the client application is installed. By way of non-limiting example, location parameters may include one or more of a real-world physical location of the users when they request installation of the client application, a real-world physical location where the users live, a real-world physical location where the users spend a large quantity of time, a recent real-world physical location visited by the users, and/or other location parameters. Gameplay parameters may describe one or more aspects of the users' gameplay in the online game accessible via the client application, and/or in other online games. For example, gameplay parameters may include one or more levels reached by the user within an online game, game progression achieved by the user, kills and/or deaths associated with the user (e.g., a K/D ratio, etc.), friend and/or associations of a given user, a preferred and/or typical style of gameplay (e.g., aggressive, passive, collaborative, and/or other styles of gameplay), a preferred and/or typical type of gameplay (e.g., a collection and harvesting type, a player versus player type, a player versus environment type, and/or other types of gameplay) one or more virtual resources and/or goods acquired via gameplay by the user within the online game, a frequency at which the user plays an online game, a quantity and/or number of times the user has engaged in gameplay in the online game, and/or other gameplay parameters. In some implementations, the gameplay parameters may describe one or more aspects of the user gameplay in the online game in a time period immediately subsequent to the user installing the client application and/or for a time period at the beginning of a user's experience within the online game.

Time parameters may indicate times associated with the user's installation and/or set up of the online game. For example, the time parameters may include one or more of a time at which the users' install the client application, register for the online game, set up a user account for the online game, first log-in to the online game, first play the online game, and/or other time parameters.

By way of non-limiting example, a parameter value for a demographic parameter for the first user may include that the first user's annual income is between $50,000-$70,000. A parameter value for a device parameter may include that the first user installed the client application on an iPhone 6. A parameter value for a location parameter may include that the first user requested installation of the client application while the user was physically located in Beverly Hills.

In some implementations, multiple parameter values may be obtained for a given user, and/or for multiple users within a given set of users. As such, user parameter component 108 may be configured to obtain parameter values associated with the first set of users, parameter values associated with the second set of users, and/or parameter values associated with one or more other users and/or other sets of users.

Economic value component 110 may be configured to determine predicted economic values of the users. The predicted economic values of the users may be determined based on the parameter values associated with the users. In some implementations, the predicted economic values for the first set of users may be determined based on the parameter values associated with the first set of users, and/or the predicted economic values for the second set of users may be determined based on the parameter values associated with the second set of users.

In some implementations, economic value component 110 may be configured to determine the predicted economic user values prior to the users participating in gameplay in the online game accessible via the client computing platform. By way of non-limiting example, the predicted economic user value for a first user may be determined prior to the first user participating in gameplay in the online game. As such, in some implementations, the predicted economic user values may be determined immediately subsequent to: a user requesting installation of the client application, installation of the client application, establishment of a user account for the online game, an initial login to the online game, and/or another initial interaction of the user with the online game and/or the installation of the client application. In some implementations, the predicted economic user values may be determined prior to the users generating revenue for the game provider (e.g., via purchases) in the online game.

In some implementations, economic value component may be configured to determine the predicted economic user values responsive to the users participating in gameplay in the online game for a limited period of time. The limited period of time may be a predetermined period of time (e.g., a certain number of minutes, hours, days, etc.) and/or a period of time it takes a user to reach a certain point in the online game.

In some implementations, the predicted economic values of the users may include a score and/or ranking for individual ones of the users indicating their predicted economic value. The predicted economic values of the users may represent a predicted economic value of the user to the game provider. For example, the predicted economic values may represent predictions of how likely a given user is to spend consideration in the online game, how often a given user is likely to spend consideration the online game, how much consideration a given user is likely to spend in the online game, a likely level of engagement of a given user, retention potential and/or likelihood for a given user, and/or other factors likely to impacts the value of a given user to the game provider.

To illustrate, previously existing systems and/or methods use purchase information indicating purchases made by users within the game to predict user value associated with the users and/or identify high-value channels. Previously existing systems and/or methods create problems for game providers because, for example, they have to wait until they have enough data points (e.g., users have made regular purchases within the online game) to predict user value and/or identify the high value channels; and/or ii) cannot make reliable user value predictions for new users because users that actually make a purchase when they first start a game (e.g., within the first few hours) are so rare that if such purchases are made by new users, previously existing systems and/or methods are likely to falsely overestimate the value of such a user and/or the channel credited with causing the user to install the client application and/or play the online game. The disclosure provided herein solves these problems by not using purchase information associated with new users to determine user and/or channel value; and/or by determining predicted economic values of the users that requested installation of the client application through individual ones of the channels. In some implementations, the predicted economic values of the users may be determined upon installation of the client application, before the user engages in gameplay in the online game.

Effectiveness component 112 may be configured to determine effectiveness metrics for the channels through which the users requested installation of the client application. Effectiveness component 112 may be configured to determine the effectiveness metrics for the channels based on the predicted economic values of the users that requested installation of the client application through the channels. In some implementations, the effectiveness metrics for the channels may be determined based on comparisons of the predicted economic values associated with users that requested installation of the client application through one channel compared to the predicted economic values associated with users that requested installation of the client application through one or more other channels. A given channel may be associated with a given effectiveness metric. The effectiveness metrics may indicate how effective individual channels are at encouraging, incentivizing, and/or eliciting potential users to request installation of the client application and/or access the online game. The effectiveness metrics may indicate economic values for the individual channels. As such, the effectiveness metrics may indicate the economic value of the promotional information item, the platform through which the promotional information item was presented to the potential users, and/or other information characterized by an individual channel. In some implementations, the higher/lower the effectiveness metric, the higher/lower the value of a given channel to a game provider, for example.

In some implementations, a first effectiveness metric for the first channel may be determined based on the predicted economic values for the first set of users that requested installation of client application through the first channel. A second effectiveness metric for the second channel may be determined based on the predicted economic values for the second set of users that requested installation of client application through the second channel. In some implementations, the first effectiveness metric for the first channel may be determined based on a comparison between the predicted economic values for the first set of users and the predicted economic values for the second set of users. In some implementations, effectiveness metrics may be determined and/or monitored for multiple channels on a continuous basis, or a non-continuous basis.

Recommendation component 114 may be configured to recommend subsequent consideration expenditures. Recommendation component 114 may be configured to recommend one or more subsequent consideration expenditure(s) for one or more of the individual channels through which one or more users and/or sets of users requested installation of the client application. In some implementations, recommendation component 114 may be configured to recommend a subsequent consideration expenditure for the first channel and/or the second channel. Recommendation component 114 may be configured to recommend a subsequent consideration expenditure for the first channel and/or the second channel based on a comparison of the first effectiveness metric for the first channel relative to the second effectiveness metric for the second channel.

In some implementations, recommendation component 114 may be configured to recommend one or multiple subsequent consideration expenditures for one or multiple channels based on the effectiveness metric(s). The subsequent consideration expenditures may include one or more future expenditures the system, and/or online game provider and/or service provider should make. The subsequent consideration expenditures recommended by recommendation component 114 may include: whether or not a subsequent consideration expenditures should be made for individual ones of the channels, amounts of subsequent consideration expenditures that should be made for individual ones of the channels, and/or other recommendations regarding subsequent consideration expenditures for individual ones of the channels. Recommendations for subsequent consideration expenditures may include one or more notifications indicating the one or more subsequent consideration expenditures recommended. The one or more notifications may be presented to the game and/or service provider via an interface. The interface may include, for example, a channel management interface through which a game provider and/or service provider may manage (e.g., view, initiate, executed, plan/schedule, etc.) subsequent consideration expenditures.

In some implementations, recommendation component 114 may be configured to execute one or more subsequent consideration expenditures for individual ones of the channels. Recommendation component 114 may be configured to execute a subsequent consideration expenditure for the first channel and/or the second channel based on a comparison of the first effectiveness metric for the first channel relative to the second effectiveness metric for the second channel. Executing a subsequent consideration expenditure may include, for example, investing resources into one or more channels, and/or changing and/or withdrawing one or more resources from one or more channels. Investing resources into one or more channels may include by way of non-limiting example, one or more of increasing a budget for a given channel, broadening a reach of one or more channels, investing funds and/or personnel resources into one or more channels, and/or otherwise investing consideration in one or more channels. Changing one or more resources from one or more channels may include switching resources, adjusting resources and/or quantities associated with the resources, and/or otherwise changing one or more resources for a one or more channels. Withdrawing one or more resources may include by way of non-limiting example, one or more of decreasing a budget for a given channel, reducing a reach of one or more channels, pausing and/or halting funds and/or personnel resources for one or more channels, and/or otherwise withdrawing one or more resources. The subsequent consideration expenditures may include and/or cause increases and/or decreases in quantity, reach, frequency, impact, impressions, interactions, and/or other results associated with individual ones of the channels.

Figure 3:
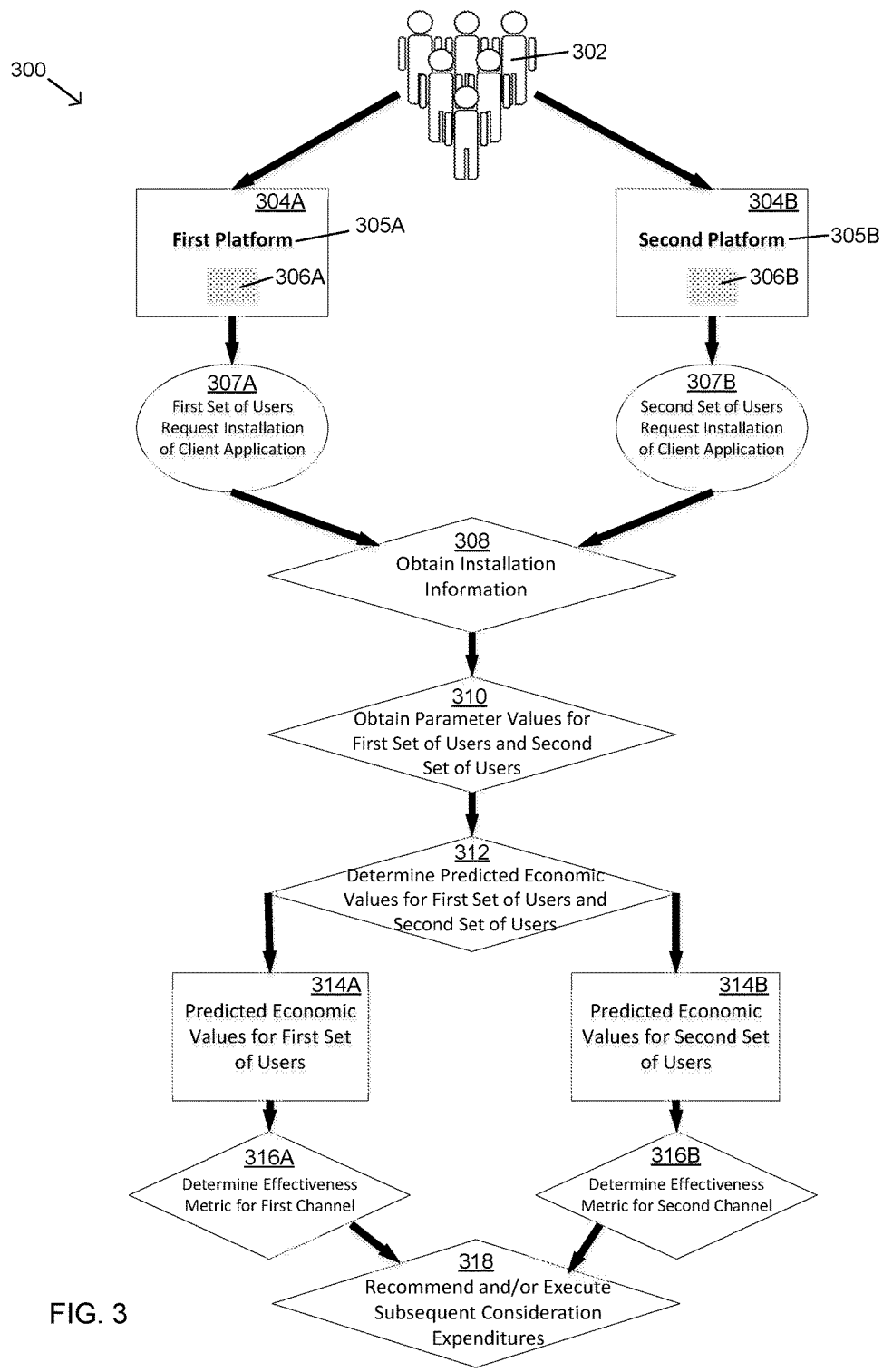
FIG. 3 illustrates a flow diagram of determining the value of channels responsive to users requesting installation of the client application through the channels, in accordance with one or more implementations.

FIG. 3 illustrates a flow diagram 300 of determining the value of channels responsive to users requesting installation of the client application through the channels, in accordance with one or more implementations. One or more users 302 may request installation of the client application through channel 304A, 304B, and/or other channels. Channel 304A may be characterized by first platform 305A, first promotional information item 306A, and/or other information. Channel 304B may be characterized by second platform 305B, second promotional information item 306B, and/or other information. A first set of users from users 302 may view and/or interact with first channel 304A. A second set of users from users 302 may view and/or interact with second channel 304B. At 307A, the first set of users may request installation of the client application through first channel 304A. At 3076, the second set of users may request installation of the client application through second channel 304B. Installation information may be obtained by the system at 308. The installation information may include first installation information identifying the first channel through which the first set of users requested installation of the client application, second installation information identifying the second channel there which the second set of users requested installation of the client application, and/or other installation information for one or more other channels. At 310, the system may obtain parameter values for the first set of users, the second set of users, and/or other users and/or sets of users. The system may determine predicted economic values for the first set of users, and a second set of users, and/or other set of users at 312. Predicted economic values for the first set of users 314A may be used at 316A to determine an effectiveness metric for first channel 304A. Predicted economic values for the second set of users 314B may be used at 316B to determine an effectiveness metric for second channel 304B. the system may recommend enter execute subsequent consideration expenditures based on the effectiveness metric determined for first channel 304A at 316A, the effectiveness metric determined for second channel 204B at 316B, and/or based on other effectiveness metrics determined for other channels, and/or other information.

Returning to FIG. 1, the server 102, client computing platforms 104, distribution platform(s) 126, and/or external resources 128 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server 102, client computing platforms 104, distribution platform(s), and/or external resources 128 may be operatively linked via some other communication media.

The external resources 128 may include sources of information, hosts and/or providers of virtual spaces outside of system 100, external entities participating with system 100, external entities for communications, and/or other resources. In some implementations, some or all of the functionality attributed herein to external resources 128 may be provided by resources included in system 100.

The server 102 may include electronic storage 122, one or more processors 124, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 122 may comprise electronic storage media that electronically stores information. The electronic storage media of electronic storage 122 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 124, information received from server 102, information received from client computing platforms 104, and/or other information that enables server 102 to function as described herein.

Processor(s) 124 is configured to provide information processing capabilities in server 102. As such, processor 124 may include one or more of a digital processor, an analog processor, a digital circuit designed to process information, an analog circuit designed to process information, a state machine, and/or other mechanisms for electronically processing information. Although processor 124 is shown in FIG. 1 as a single entity, this is for illustrative purposes only. In some implementations, processor 124 may include one or more processing units. These processing units may be physically located within the same device, or processor 124 may represent processing functionality of a plurality of devices operating in coordination. The processor 124 may be configured to execute components 106, 108, 110, 112, and/or 114. Processor 124 may be configured to execute components 106, 108, 110, 112, and/or 114 by software; hardware; firmware; some combination of software, hardware, and/or firmware; and/or other mechanisms for configuring processing capabilities on processor 124.

It should be appreciated that although components 106, 108, 110, 112, and/or 114 are illustrated in FIG. 1 as being co-located within a single processing unit, in implementations in which processor 124 includes multiple processing units, one or more of components 106, 108, 110, 112, and/or 114 may be located remotely from the other components. The description of the functionality provided by the different components 106, 108, 110, 112, and/or 114 described above is for illustrative purposes and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, 114, and/or other components. As another example, processor 124 may be configured to execute one or more additional components that may perform some or all of the functionality attributed below to one of components 106, 108, 110, 112, and/or 114.

Figure 4:
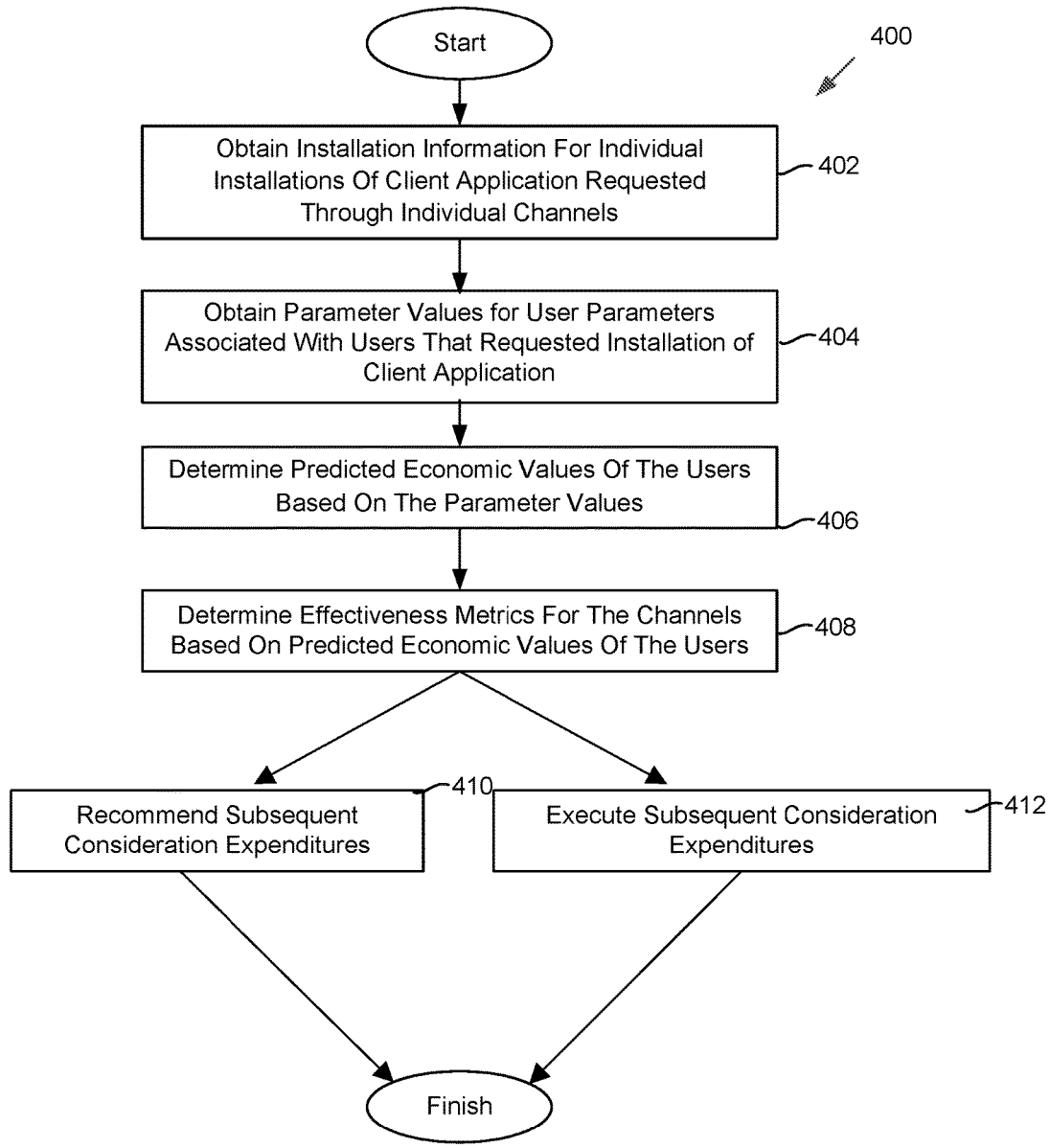
FIG. 4 illustrates a method for determining the value of channels through which users may request installation of a client application, in accordance with one or more implementations.

FIG. 4 illustrates a method 400 for determining the value of channels through which users may request installation of a client application, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on electronic storage medium. The one or more processing devices may include one or more devices configured through hardware, firmware, and/or software to be specifically designed for execution of one or more of the operations of method 400.

Referring now to method 400 in FIG. 4, at an operation 402, installation information may be obtained. The installation information may be for individual installations of the client application requested their individual ones of the channels. The installation information may identify the specific channels through which individual ones of the users requested installation of the client application. As such, first installation information, second installation information, and/or other installation information may be obtained. The first installation information may identify the first channel through which a first set of users requested installation of the client application. The first channel may be characterized by a first promotional information item, a first platform through which the first promotional information item was presented to the first set of users, and/or other information. The second installation information may identify the second channel through which a second set of users requested installation of the client application. The second channel may be characterized by a second promotional information item, a second platform through which the second promotional information item was presented to the second set of users, and/or other information. In some implementations, operation 402 may be performed by an installation information component the same as or similar to installation information component 106 (shown in FIG. 1 and described herein).

At an operation 404, parameter values for user parameters may be obtained. The user values for the user parameters may be associated with the users that requested installation of the client application. The user parameters may include demographic parameters. As such, parameter values associated with the first set of users and/or parameter values associated with the second set of users may be obtained. In some implementations, operation 404 may be performed by a user parameter component the same as or similar to the user parameter component 108 (shown in FIG. 1 and described herein).

At an operation 406, predicted economic values of the users may be determined. The predicted economic values of the users may be determined based on the parameter values for the users. For example, the predicted economic values for the first set of users may be determined based on the parameter values associated with the first of the users. The predicted economic values for the second set of users may be determined based on the parameter values associated with the second set of users. In some implementations, operation 406 may be performed by an economic value component the same as or similar to economic value component 110 (shown in FIG. 1 and described herein).

At an operation 408, effectiveness metric for the channels through which the users requested installation of the client application may be determined. The effectiveness metric may be determined based on the predicted economic values of the users. As such, a first effectiveness metric for the first channel may be determined based on the predicted economic values for the first set of users that requested installation of the client application through the first channel. A second effectiveness metric for the second channel may be determined based on the predicted economic values for the second set of users that requested installation of the client application through the second channel. In some implementations, operation 408 may be performed by an effectiveness component the same as or similar to effectiveness component 112 (shown in FIG. 1 and described herein).

In some implementations, at an operation 410, subsequent consideration expenditures may be recommended. The subsequent consideration expenditures may be recommended for the first channel, the second channel, and/or another channel. Subsequent consideration expenditures may be recommended for the first channel and/or the second channel based on a comparison of the first of effectiveness metric for the first channel relative to the second effectiveness metric for the second channel. In some implementations, operation 410 may be performed by a recommendation component the same as or similar to recommendation component 114 (shown in FIG. 1 and described herein).

In some implementations, at an operation 412, subsequent consideration expenditures may be executed. The subsequent consideration expenditures may be for the first channel and/or for the second channel. Subsequent consideration expenditures for the first channel and/or the second channel may be executed based on a comparison of the first effectiveness metric for the first channel relative to the second effectiveness metric for the second channel. In some implementations, operation 412 may be performed by a recommendation component the same as or similar to recommendation component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to determine the value of channels responsive to users requesting installation of a client application through the channels, wherein the client application provides access to an online game, and wherein a given channel is characterized by a promotional information item and a platform through which the promotional information item is presented to potential users, the system comprising:
   one or more processors configured by machine-readable instructions to:
      present a first promotional item via a first platform to a first superset of users;
      present a second promotional item via a second platform to a second superset of users;
      obtain installation information for individual installations of the client application requested through individual ones of the channels, the installation information identifying the specific channels through which individual ones of the users requested installation of the client application such that:
         first installation information identifies a first channel through which a first set of users requested installation of the client application, subsequent to presentation of the first promotional item, is obtained, the first channel being characterized by the first promotional information item and the first platform through which the first promotional information item was presented to the first set of users, wherein the first set of users is a subset of the first superset of users, and
         second installation information identifies a second channel through which a second set of users requested installation of the client application, subsequent to presentation of the second promotional item, is obtained, the second channel being characterized by the second promotional information item and the second platform through which the second promotion information item was presented to the second set of users, wherein the second set of users is a subset of the second superset of users;
      obtain parameter values for user parameters associated with the users that requested installation of the client application, the user parameters including demographic parameters, such that parameter values associated with the first set of users and parameter values associated with the second set of users are obtained, wherein the demographic parameters include one or more of age, sex, education level, income level, marital status, occupation, and/or religion;
      determine predicted economic values of the users based on the parameter values for one or more of the demographic parameters, wherein the predicted economic values for the first set of users are determined based on the parameter values associated with the first set of users, and the predicted economic values for the second set users are determined based on the parameter values associated with the second set of users, wherein the predicted economic values of the users represents one or more of a prediction for how likely the users are to spend consideration in the online game, a prediction for how often the users are likely to spend consideration in the online game, a prediction for how much the users are likely to spend in the online game, and/or a prediction for the likely level of engagement of the users in the online game;

determine effectiveness metrics for the channels through which the users requested installation of the client application based on the predicted economic values of the users, such that a first effectiveness metric for the first channel is determined based on the predicted economic values for the first set of users that requested installation of the client application through the first channel and a second effectiveness metric for the second channel is determined based on the predicted economic values for the second set of users that requested installation of the client application through the second channel; and recommend subsequent consideration expenditures for the first channel and/or the second channel based on a comparison of the first effectiveness metric for the first channel relative to the second effectiveness metric for the second channel.

2. The system of claim 1, wherein the user parameters further include device parameters that characterize client computing platforms on which the users install the client application.

3. The system of claim 1, wherein the one or more processors are configured by machine-readable instructions to determine the predicted economic user values prior to the users participating in gameplay in the online game.

4. The system of claim 1, wherein the one or more processors are configured by machine-readable instructions to determine the predicted economic user values prior to the users generating revenue for the game provider via purchases in the online game.

5. The system of claim 1, wherein the one or more processors are configured by machine-readable instructions to determine the predicted economic user values responsive to the users participating in gameplay in the online game for a limited period of time.

6. The system of claim 1, wherein the user parameters include one or more of location parameters, gameplay parameters, and/or time parameters.

7. The system of claim 1, wherein the first effectiveness metric for the first channel is further determined based on a comparison between the predicted economic values for the first set of users and the predicted economic values for the second set of users.

8. The system of claim 1, wherein the promotional information item includes one or more of an advertisement, an offer, and/or an endorsement related to the online game.

9. The system of claim 1, wherein the platform through which the promotional information item is presented to the potential users includes one or more of a social media platform, a game distribution platform, an email platform, a web search platform, a website platform, and/or an application platform.

10. The system of claim 1, wherein requesting installation of the client application through the channels includes one or more of directly requesting installation of the client application through a channel and/or indirectly requesting installation of the client application through the channel.

11. A system configured to determine the value of channels through which application installations are requested responsive to users requesting installation of a client application through the channels, wherein the client application provides access to an online game, and wherein a given channel is characterized by a promotional information item and a platform through which the promotional information item is presented to potential users, the system comprising:

one or more processors configured by machine-readable instructions to:

present a first promotional item via a first platform to a first superset of users;

present a second promotional item via a second platform to a second superset of users;

obtain installation information for individual installations of the client application requested through individual ones of the channels, the installation information identifying the specific channels through which individual ones of the users requested installation of the client application such that:

first installation information identifies a first channel through which a first set of users requested installation of the client application, subsequent to presentation of the first promotional item, is obtained, the first channel being characterized by the first promotional information item and the first platform through which the first promotional information item was presented to the first set of users, wherein the first set of users is a subset of the first superset of users, and second installation information identifies a second channel through which a second set of users requested installation of the client application, subsequent to presentation of the second promotional item, is obtained, the second channel being characterized by the second promotional information item and the second platform through which the second promotion information item was presented to the second set of users, wherein the second set of users is a subset of the second superset of users;

obtain parameter values for user parameters associated with the users that requested installation of the client application, the user parameters including demographic parameters, such that parameter values associated with the first set of users and parameter values associated with the second set of users are obtained, wherein the demographic parameters include one or more of age, sex, education level, income level, marital status, occupation, and/or religion;

determine predicted economic values of the users based on the parameter values for one or more of the demographic parameters, wherein the predicted economic values for the first set of users are determined based on the parameter values associated with the first set of users, and the predicted economic values for the second set users are determined based on the parameter values associated with the second set of users, wherein the predicted economic values of the users represents one or more of a prediction for how likely the users are to spend consideration in the online game, a prediction for how often the users are likely to spend consideration in the online game, a prediction for how much the users are likely to spend in the online game, and/or a prediction for the likely level of engagement of the users in the online game;

determine effectiveness metrics for the channels through which the users requested installation of the client application based on the predicted economic values of the users, such that a first effectiveness metric for the first channel is determined based on the predicted economic values for the first set of users that requested installation of the client application through the first channel and a second effectiveness metric for the second channel is determined based on the predicted economic values for the second set of users that requested installation of the client application through the second channel; and
execute subsequent consideration expenditures for the first channel and/or the second channel based on a comparison of the first effectiveness metric for the first channel relative to the second effectiveness metric for the second channel.

12. A method configured to determine the value of channels through which application installations are requested responsive to users requesting installation of a client application through the channels, wherein the client application provides access to an online game, and wherein a given channel is characterized by a promotional information item and a platform through which the promotional information item is presented to potential users, the method being implemented in a computer system that includes one or more processors configured by machine-readable instructions, the method comprising:

presenting a first promotional item via a first platform to a first superset of users;

presenting a second promotional item via a second platform to a second superset of users;

obtaining installation information for individual installations of the client application requested through individual ones of the channels, the installation information identifying the specific channels through which individual ones of the users requested installation of the client application such that:

first installation information identifies a first channel through which a first set of users requested installation of the client application, subsequent to presentation of the first promotional item, is obtained, the first channel being characterized by a first promotional information item and a first platform through which the first promotional information item was presented to the first set of users, and second installation information identifies a second channel through which a second set of users requested installation of the client application, subsequent to presentation of the second promotional item, is obtained, the second channel being characterized by a second promotional information item and a second platform through which the second promotion information item was presented to the second set of users;

obtaining parameter values for user parameters associated with the users that requested installation of the client application, the user parameters including demographic parameters, such that parameter values associated with the first set of users and parameter values associated with the second set of users are obtained, wherein the demographic parameters include one or more of age, sex, education level, income level, marital status, occupation, and/or religion;

determining predicted economic values of the users based on the parameter values for one or more of the demographic parameters, wherein the predicted economic values for the first set of users are determined based on the parameter values associated with the first set of users, and the predicted economic values for the second set users are determined based on the parameter values associated with the second set of users, wherein the predicted economic values of the users represents one or more of a prediction for how likely the users are to spend consideration in the online game, a prediction for how often the users are likely to spend consideration in the online game, a prediction for how much the users are likely to spend in the online game, and/or a prediction for the likely level of engagement of the users in the online game;

determining effectiveness metrics for the channels through which the users requested installation of the client application based on the predicted economic values of the users, such that a first effectiveness metric for the first channel is determined based on the predicted economic values for the first set of users that requested installation of the client application through the first channel and a second effectiveness metric for the second channel is determined based on the predicted economic values for the second set of users that requested installation of the client application through the second channel; and recommending subsequent consideration expenditures for the first channel and/or the second channel based on a comparison of the first effectiveness metric for the first channel relative to the second effectiveness metric for the second channel.

13. The method of claim 12, wherein the user parameters further include device parameters that characterize client computing platforms on which the users install the client application.

14. The method of claim 12, further comprising determining the predicted economic user values prior to the users participating in gameplay in the online game.

15. The method of claim 12, further comprising determining the predicted economic user values prior to the users generating revenue for the game provider via purchases in the online game.

16. The method of claim 12, further comprising determining the predicted economic user values responsive to the users participating in gameplay in the online game for a limited period of time.

17. The method of claim 12, wherein the user parameters include one or more of location parameters, gameplay parameters, and/or time parameters.

18. The method of claim 12, wherein the first effectiveness metric for the first channel is further determined based on a comparison between the predicted economic values for the first set of users and the predicted economic values for the second set of users.

19. The method of claim 12, wherein the promotional information item includes one or more of an advertisement, an offer, and/or an endorsement related to the online game.

20. The method of claim 12, wherein the platform through which the promotional information item is presented to the potential users includes one or more of a social media platform, a game distribution platform, an email platform, a web search platform, a website platform, and/or an application platform.

21. The method of claim 12, wherein requesting installation of the client application through the channels includes one or more of directly requesting installation of the client application through a channel and/or indirectly requesting installation of the client application through the channel.

* * * * *